US012550840B1

(12) United States Patent
Jakiela et al.

(10) Patent No.: US 12,550,840 B1
(45) Date of Patent: Feb. 17, 2026

(54) HYDROPONIC PLANT GROWTH MODULE AND RELATED METHOD

(71) Applicant: Just Vertical Incorporated, Etobicoke (CA)

(72) Inventors: Kevin Stanley Jakiela, Schomberg (CA); Conner Thomas Shaw Tidd, Toronto (CA)

(73) Assignee: Just Vertical Incorporated, Etobicoke (CA)

( * ) Notice: Subject to any disclaimer, the term of this patent is extended or adjusted under 35 U.S.C. 154(b) by 0 days.

(21) Appl. No.: 19/071,463

(22) Filed: Mar. 5, 2025

(51) Int. Cl.
*A01G 31/02* (2006.01)
*A01G 7/04* (2006.01)
*A01G 9/24* (2006.01)
*A01G 31/06* (2006.01)

(52) U.S. Cl.
CPC ........... *A01G 31/025* (2025.01); *A01G 7/045* (2013.01); *A01G 9/249* (2019.05); *A01G 31/06* (2013.01)

(58) Field of Classification Search
CPC .... A01G 31/025; A01G 31/065; A01G 9/249; A01G 7/045
See application file for complete search history.

(56) References Cited

U.S. PATENT DOCUMENTS

| | | | |
|---|---|---|---|
| 3,931,695 A * | 1/1976 | Widmayer | A01G 9/249 47/60 |
| 10,306,847 B2 | 6/2019 | Varone et al. | |
| 10,856,480 B2 | 12/2020 | Moffitt et al. | |
| 11,178,824 B2 | 11/2021 | Heidl et al. | |
| 11,229,165 B2 | 1/2022 | Iamundi | |
| 11,274,817 B2 * | 3/2022 | Wu | A01G 7/045 |
| 11,388,869 B2 | 7/2022 | Storey | |
| 11,647,708 B2 | 5/2023 | Langille et al. | |
| 2015/0092397 A1 * | 4/2015 | Liu | F21V 33/0012 362/127 |
| 2016/0029578 A1 | 2/2016 | Martin et al. | |
| 2016/0029581 A1 | 2/2016 | Martin et al. | |

(Continued)

FOREIGN PATENT DOCUMENTS

| | | |
|---|---|---|
| CN | 110521578 A | 12/2019 |
| CN | 215421895 U | 1/2022 |

(Continued)

*Primary Examiner* — Magdalena Topolski
*Assistant Examiner* — Katherine Anne Kloecker
(74) *Attorney, Agent, or Firm* — SMART & BIGGAR LP; Nicholas Aitken

(57) ABSTRACT

A hydroponic plant growth module includes a front module side facing in a forward direction, a frame having an upper end vertically spaced apart from a lower end, and a plant growth subassembly positioned at the front module side. The plant growth subassembly includes a plurality of vertically extending columns secured to the module frame and distributed in a lateral direction. Each column has a front column side facing in the forward direction and a plurality of growth pod ports in the front column side and vertically distributed along the column. The plant growth subassembly further includes a grow light assembly positioned outwardly of the columns in the forward direction. The grow light assembly has at least one light source and a light vector that directs at least 75% of light emitted from the at least one light source outwardly away from the columns in the forward direction.

15 Claims, 9 Drawing Sheets

(56) References Cited

U.S. PATENT DOCUMENTS

| | | | |
|---|---|---|---|
| 2017/0303484 A1 | 10/2017 | Wilson et al. | |
| 2018/0288954 A1 | 10/2018 | Glaser et al. | |
| 2019/0059238 A1* | 2/2019 | Ting | A01G 9/028 |
| 2021/0127608 A1 | 5/2021 | Hardgrove | |
| 2022/0046875 A1 | 2/2022 | Clemmer et al. | |
| 2022/0287256 A1 | 9/2022 | Clemmer | |
| 2022/0330504 A1 | 10/2022 | Langille et al. | |
| 2022/0369566 A1* | 11/2022 | Venkata | A01G 9/16 |
| 2023/0172115 A1* | 6/2023 | van Buuren | A01G 9/249 47/62 C |
| 2023/0270054 A1* | 8/2023 | Grauberger | A01G 9/249 47/17 |
| 2024/0188508 A1* | 6/2024 | Moffitt | A01G 9/247 |

FOREIGN PATENT DOCUMENTS

| | | | |
|---|---|---|---|
| KR | 1020210066213 A | 6/2021 | |
| KR | 1020210108647 A | 9/2021 | |
| KR | 1020210148815 A | 12/2021 | |
| KR | 1020210148818 A | 12/2021 | |
| KR | 102365653 B1 | 2/2022 | |
| KR | 102568970 B1 | 8/2023 | |
| WO | 2015188177 A2 | 12/2015 | |
| WO | 2019006019 A1 | 1/2019 | |
| WO | 2020092503 A1 | 5/2020 | |
| WO | 2024107936 A2 | 5/2024 | |
| WO | WO-2024147758 A1 * | 7/2024 | A01G 31/065 |

* cited by examiner

HYDROPONIC PLANT GROWTH MODULE AND RELATED METHOD

FIELD

This application relates generally to the field of hydroponics and methods of using hydroponic systems.

INTRODUCTION

Hydroponics offers a soil-free alternative to plant cultivation, utilized in both private home applications and large-scale commercial farming. Hydroponic systems are systems that use nutrient-rich water solutions to directly nourish plants and artificial light sources to provide the necessary spectrum of light for photosynthesis. Adequate exposure to such artificial light sources is needed to promote healthy plant growth.

DRAWINGS

SUMMARY

Figure 1A:
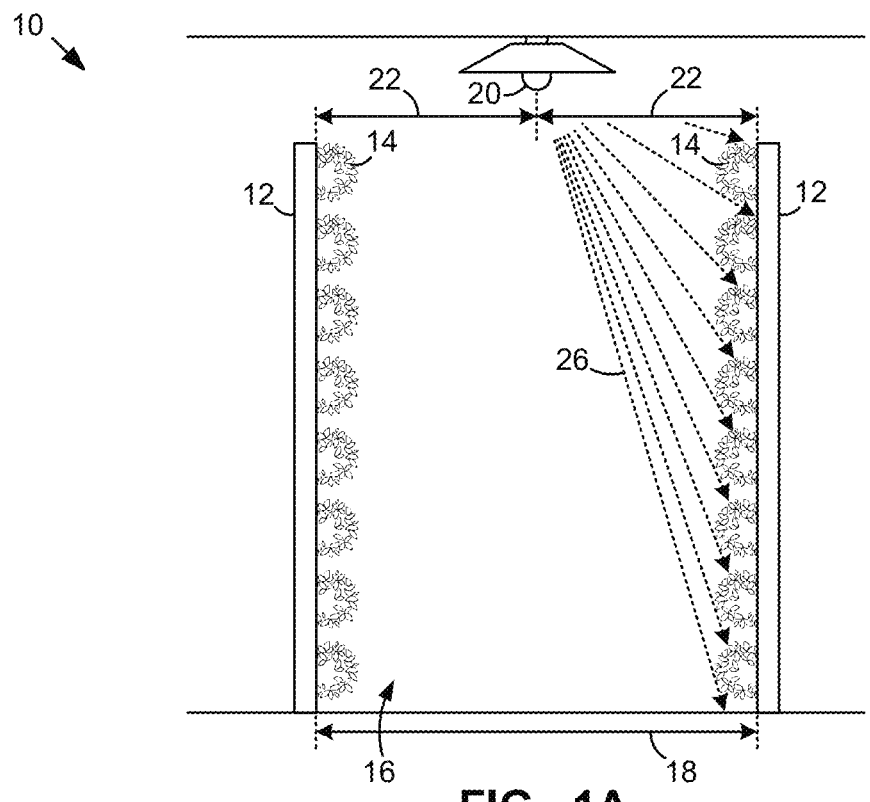
FIG. 1A is a schematic side view of an example existing vertical hydroponic system with an artificial light source mounted to a ceiling and shining onto opposed grow walls.

In accordance with one aspect of this disclosure, a hydroponic plant growth module includes a front module side facing in a forward direction, a module frame having an upper frame end vertically spaced apart from a lower frame end, and a plant growth subassembly positioned at the front module side of the growth module. The plant growth subassembly includes a plurality of vertically extending growth columns secured to the module frame. The plurality of growth columns are distributed across the module frame in a lateral direction. Each growth column has a front column side facing in the forward direction, and a plurality of growth pod ports in the front column side and vertically distributed along the growth column. The plant growth subassembly further includes a grow light assembly positioned outwardly of the growth columns in the forward direction. The grow light assembly has at least one light source, and a light vector that directs at least 75% of light emitted from the at least one light source outwardly away from the growth columns in the forward direction.

In accordance with one aspect of this disclosure, a hydroponic plant growth system includes a first growth module spaced apart from and opposed to a second growth module. The first growth module has a front module side oriented to face in a first forward direction toward a front module side of the second growth module, a module frame having an upper frame end vertically spaced apart from a lower frame end, and a plant growth subassembly positioned at the front module side. The plant growth subassembly includes a plurality of vertically extending growth columns secured to the module frame. The plurality of growth columns are distributed across the module frame in a lateral direction. Each growth column has a front column side facing in the first forward direction, and a plurality of growth pod ports in the front column side and vertically distributed along the growth column. The plant growth subassembly further includes a grow light assembly positioned outwardly of the growth columns in the first forward direction. The grow light assembly has at least one light source, and a light vector that directs at least 75% of light emitted from the at least one light source outwardly away from the growth columns in the first forward direction toward the front module side of the second growth module.

In accordance with one aspect of this disclosure, a method of growing plants using a hydroponic plant growth system includes emitting light from a first grow light source of a first growth module outwardly away from a front module side of the first growth module in a first forward direction to illuminate a front module side of a second growth module, and emitting light from a second grow light source of the second growth module outwardly away from the front module side of the second growth module in a second forward direction to illuminate the front module side of the first growth module. The front module side of the second growth module is spaced apart from and facing the front module side of the first growth module. The second forward direction is opposite to the first forward direction. The method further includes irrigating a first plurality of plants having roots at a plurality of growth pod ports in the front module side of the first growth module, and irrigating a second plurality of plants having roots at a plurality of growth pod ports in the front module side of the second growth module.

These and other aspects and features of various embodiments will be discussed in greater detail below.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112$a$, or 112$_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

General Description of Vertical Hydroponic Systems

A vertical hydroponic system is a type of hydroponic system where plants are grown in vertically stacked layers or columns. A key benefit of vertical hydroponic systems lies in the use of vertical space, often using towers, walls, or racks to create vertically arranged grow areas. This allows for more efficient use of limited space, increasing yield per square foot, which is particularly advantageous in urban environments or indoor settings where square footage is limited.

FIG. 1A shows a schematic of a typical vertical hydroponic system 10. The hydroponic system 10 includes opposed grow walls 12, each carrying a plurality of plants 14. The grow walls 12 are oriented parallel to each other and are spaced apart by an aisle 16 having an aisle width 18. The aisle width 18 extends from one grow wall 12 to the opposed grow wall 12. A user may move within the aisle 16 to cultivate and harvest the plants 14 on the grow walls 12. The hydroponic system 10 further includes an artificial light source 20 mounted to the ceiling above the aisle 16. The artificial light source 20 is centered above the aisle 16 at a lighting distance 22 to each grow wall 12 to shine onto the plants 14 on both walls.

Vertical hydroponic systems often incorporate artificial lighting to simulate natural sunlight and provide plants with the proper light spectrum for photosynthesis. Artificial lighting is thus employed to ensure that plants receive consistent exposure to the proper light spectrum, which is intended to accelerate growth and maximize yields. However, artificial lighting in vertical hydroponic systems presents several problems. For example, the artificial light source must be appropriately positioned (e.g., spaced and/or angled) relative to the plants to provide adequate light distribution across each grow wall. Lights that are too far away from the plants may not provide enough intensity for effective photosynthesis. Conversely, lights that are too close to the plants may result in uneven penetration of the light across the entire plant canopy due to shadows forming in areas where light is obstructed by the plant foliage. Uneven lighting from poorly positioned lights can lead to poor plant growth, as shaded areas may not photosynthesize effectively, resulting in stunted or uneven development and reduced yield.

For example, in the vertical hydroponic system 10 of FIG. 1A, light emitted from the artificial light source 20 to the plants 14 on one grow wall 12 is indicated by light spread lines 26. As shown, the plants 14 that are further from the artificial light source 20 get less exposure to the emitted light as a greater amount of the plant 14 is shaded. For example, as shown, the top of each plant 14 may be at least partially shaded from emitted light by the foliage of another plant 14 above. That is, for each successive plant 14 moving from the upper end to the lower end of the grow wall 12, the light spread line 26 is unable to reach an increasing amount of the top of the plant 14 due to blocking by the foliage of the plant 14 above. Additionally, as shown, the bottom of each plant 14 may be at least partially shaded from emitted light by the foliage of that plant 14 itself. That is, the foliage of each successive plant 14 moving from the upper end to the lower end of the grow wall 12 blocks the light spread line 26 from reaching an increasing amount of the bottom of that plant 14.

Another problem with artificial lighting arises in scaled vertical hydroponic systems, such as large-scale commercial farming, in which two or more rows of grow walls are arranged in parallel. In such large-scale systems, the spacing between adjacent rows of grow walls is controlled by the requirements of the artificial light source described above. That is, the grow walls must be sufficiently distanced from the artificial light source to receive adequate exposure across the grow wall. This may increase the footprint of each grow wall, or each pair of grow walls, and thereby decrease the yield per square foot of the system.

For example, in the vertical hydroponic system 10 of FIG. 1A, the lighting distance 22 extending from the artificial light source 20 to each grow wall 12 must be sufficient to provide adequate light exposure across each grow wall 12. Accordingly, in typical large-scale vertical hydroponic systems such as exemplified in FIG. 1A, the minimum aisle width 18 is controlled by the combined lighting distance 22 from the artificial light source 20 to each grow wall 12. For example, in the vertical hydroponic system 10 shown, the minimum aisle width aisle width 18 is as at least twice the lighting distance 22. Consequently, the aisle width 18 may be greater than required for the user to move within the aisle 16 and cultivate and harvest plants 14 on the grow walls 12.

This may result in a greater footprint than necessary for parallel rows of grow walls 12. A greater footprint may thereby reduce the overall plant yield potential (i.e., yield per square foot) of the vertical hydroponic system 10, since less rows of grow walls 12 may fit into a given space.

Figure 1B:
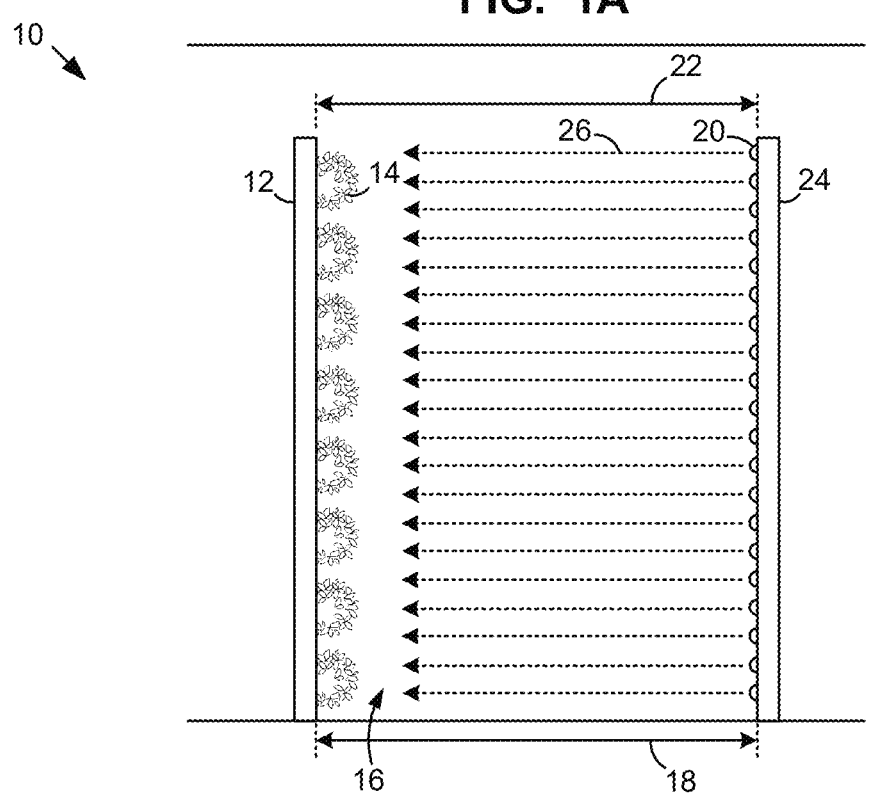
FIG. 1B is a schematic side view of another example existing vertical hydroponic system with a light wall having artificial light sources shining onto an opposed grow wall.

FIG. 1B shows a schematic of another typical vertical hydroponic system 10. In the hydroponic system 10 of FIG. 1B, a single grow wall 12 faces a light wall 24 and is spaced a lighting distance 22 across the aisle 16 from the artificial light sources 20 of the light wall 24. The design of the light wall 24 seeks to address the issue of inadequate light distribution of the hydroponic system 10 of FIG. 1A by providing a plurality of artificial light sources 20 vertically distributed along the light wall 24 and directed to shine onto the plants 14 on the grow wall 12. Additionally, in contrast to the hydroponic system 10 of FIG. 1A, the lighting distance 22 is controlled by the minimum aisle width 18 needed for a user to move within the aisle 16 and cultivate and harvest plants 14 on the grow wall 12. However, such a design exacerbates the problems that arise in scaled vertical hydroponic systems.

For example, the hydroponic system 10 of FIG. 1B has a single grow wall 12 on one side of the aisle 16. All else being equal, the hydroponic system 10 of FIG. 1B therefore has half the growing capacity of the hydroponic system 10 of FIG. 1A, which has two grow walls 12. Accordingly, although the footprint of parallel grow wall 12 and light wall 24 rows may be less than the hydroponic system 10 of FIG. 1A, the overall plant yield potential of the hydroponic system 10 of FIG. 1B may nonetheless be less than that of the hydroponic system 10 of FIG. 1A, since less total number of grow walls 12 may be used in a given space.

Provision of adequate light distribution across grow walls therefore remain at odds with plant yield potential in typical vertical hydroponic systems. That is, efforts to provide adequate light distribution across grow walls in typical vertical hydroponic systems directly and adversely affects plant yield potential of those systems.

General Description of a Hydroponic Plant Growth Module

Figure 2:
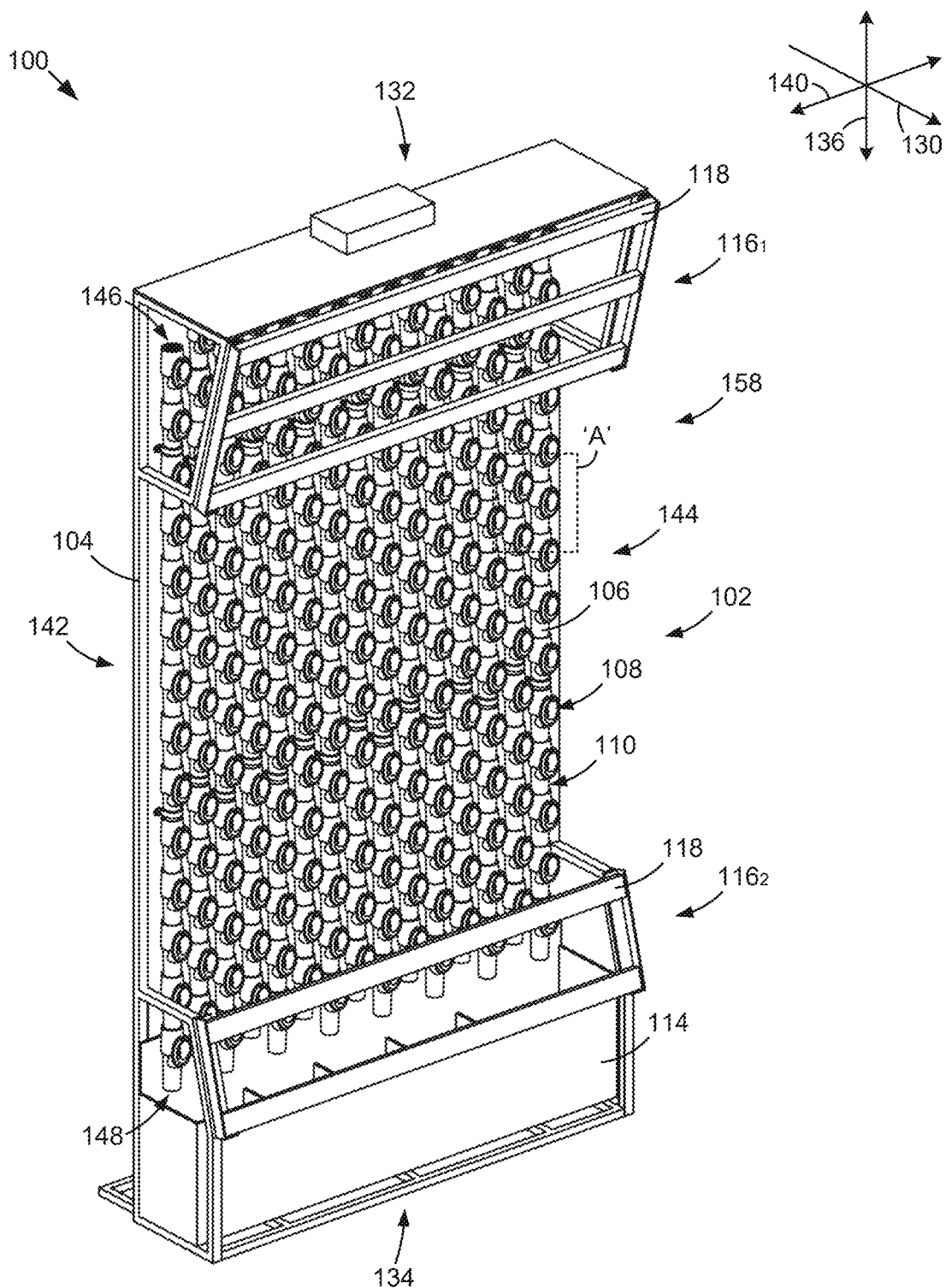
FIG. 2 is a front perspective view of an example hydroponic plant growth module with one plant growth subassembly, in accordance with an embodiment.

Referring to FIG. 2, disclosed herein is a hydroponic plant growth module, generally referred to as growth module 100. The growth module 100 may be used in hydroponic plant growth systems such as the example hydroponic plant growth systems shown in FIGS. 8 and 9, which are generally referred to as growth system 200. The growth module 100 addresses some or all of the above-described problems with traditional vertical hydroponic systems, such as when employed in the growth system 200. For clarity, embodiments of growth module 100 may address any one or more of the above-described problems, and as such, some embodiments may yet have one or more of the above-described problems unresolved. In some cases, embodiments of growth module 100 may address other problems or have other advantages not described above and have one or more of the above-described problems unresolved.

Figure 3:
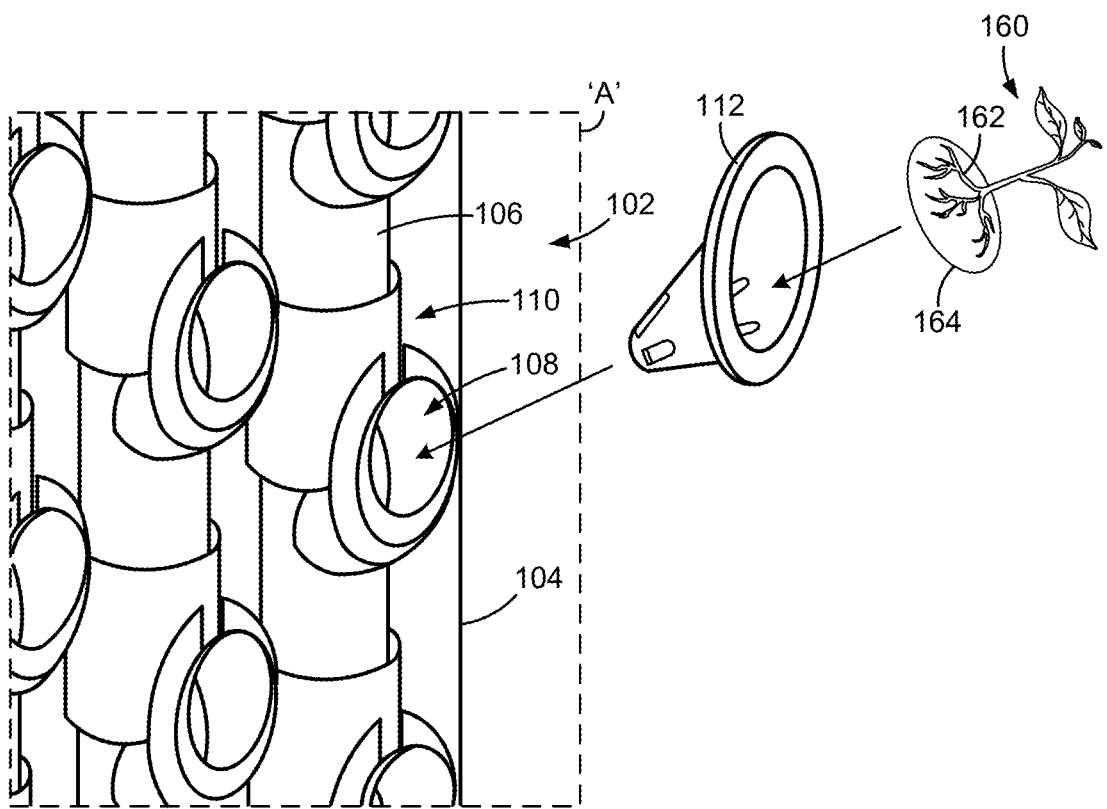
FIG. 3 is an enlarged view of a group of growth pod ports of the hydroponic plant growth module of FIG. 2 in encircled section 'A' with a growth pod insertable in a growth pod port.

Referring to FIG. 2, the growth module 100 has a front module side 102. The growth module 100 further has a module frame 104 and a plurality of growth columns 106 secured to the module frame 104 at the front module side 102. As shown, each growth column 106 has a plurality of growth pod ports 108 in a front column side 110 of the growth column 106. Referring briefly to FIG. 3, as shown, a growth pod 112 corresponding in size and shape to the growth pod ports 108 may be removably mounted in each growth pod port 108. Each growth pod 112 may hold a plant 160 having roots 162 and, optionally, a growing medium 164, which may support the roots 162 of the plant 160 while also allowing them to access a nutrient solution delivered by a nutrient delivery system of the growth module 100.

Figure 4:
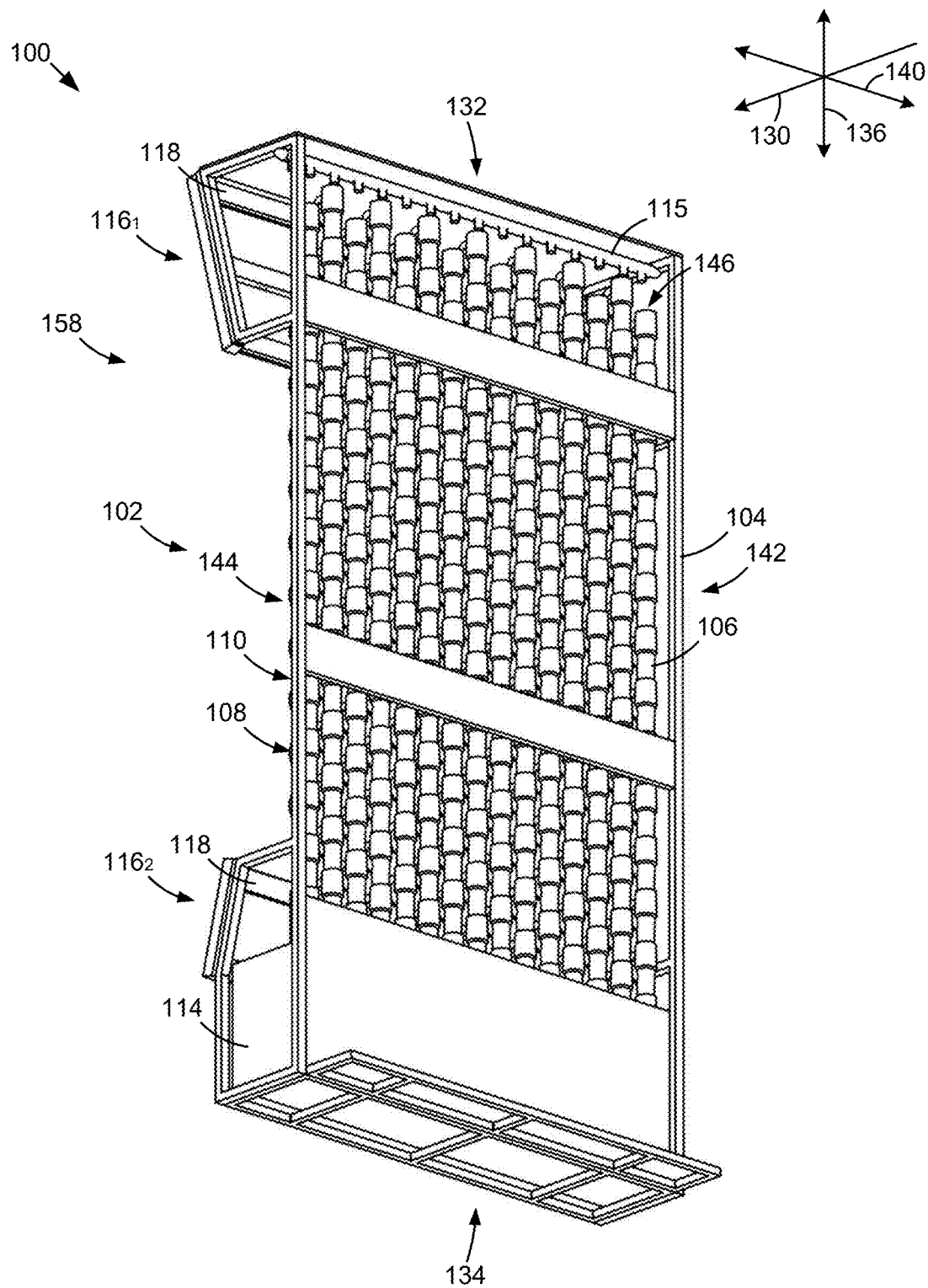
FIG. 4 is a rear perspective view of the hydroponic plant growth module of FIG. 2.

Referring to FIGS. 2 and 4, the nutrient delivery system includes a reservoir 114 positioned below the growth columns 106 at the base of the growth module 100. The reservoir 114 may be sized to accommodate the volume of water and liquid nutrients (i.e., the nutrient solution) required to nourish all the plants 160 on the growth module 100. The nutrient solution may provide essential minerals and water to the plants 160 needed for optimal development. The nutrient solution may bypass the need for soil, which may allow for more efficient nutrient uptake, resulting in faster growth rates. The nutrient delivery system further includes a pump (not shown), which is responsible for moving the nutrient solution from the reservoir 114 up a supply conduit 115 (seen in part in FIG. 4) to the top of the growth columns 106. The supply conduit 115 may distribute the nutrient solution evenly across the growth columns 106. Due to gravity, a stream of nutrient solution may flow from the supply conduit 115 downwardly through each of the growth columns 106, over at least a portion of the growth pods 112 that extend into the growth columns 106 through the growth pod ports 108. The downward flow of the nutrient solution may be induced by gravity alone or supplemented by the pump, which may assist in maintaining the pressure and consistency of the flow without over-saturating the optional growing medium 164. The nutrient solution may be recirculated, so that excess solution drains back into the reservoir 114 for reuse, minimizing waste.

Figure 6:
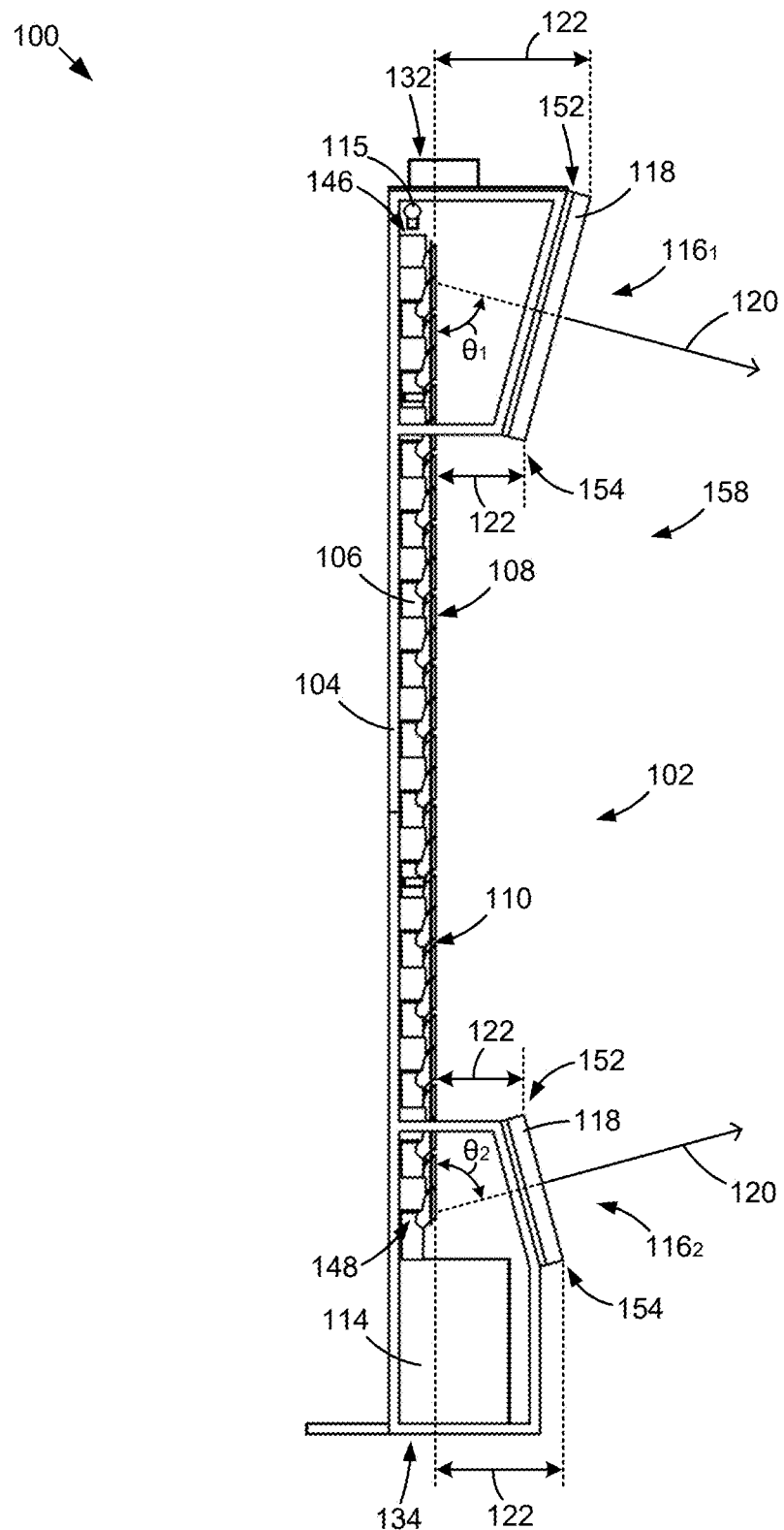
FIG. 6 is a side view of the hydroponic plant growth module of FIG. 2.

Referring to FIGS. 2 and 6, the growth module 100 further includes a grow light assembly 116 having at least one light source 118. As used herein and in the claims, a light source 118 refers to an artificial light source designed to emit the specific wavelengths of light (measured in nanometers, or nm) necessary for plant growth. These lights typically emit a spectrum that includes blue light (in the range of 400-500 nm, or more particularly 450-495 nm) for vegetative growth and/or red light (in the range of 590-800 nm, or more particularly 620-750 nm) for flowering and fruiting. As shown, each light source 118 of the grow light assembly 116 is spaced apart from the front column side 110 of the growth columns 106 by a separation distance 122. Each light source 118 of the grow light assembly 116 faces away from the growth columns 106 of the growth module 100 such that light emitted from the light source 118 is directed outwardly away from the growth columns 106.

Referring to FIG. 6, the grow light assembly 116 further includes a light vector 120. Since each light source 118 faces away from the growth columns 106 of the growth module 100, the light vector 120 of the grow light assembly 116 directs light emitted from the at least one light source 118 away from the growth columns 106. As used herein and in the claims, the light vector is the idealized direction of outgoing light from the light source 118 to a point in space or on a surface. "Idealized" refers to the simplified representation of light's direction, assuming it travels in a straight line without considering scattering, diffusion, or other complex behaviors of light. In this context, the light vector 120 represents the primary, unaltered direction in which light is considered to propagate from the light source(s) 118 for purposes of illumination.

The design of the growth module 100 and, in particular, the design of the grow light assembly 116 thereof, may mitigate or eliminate any one or more (or all) of the issues common to existing vertical hydroponic systems described previously. Referring to the growth system 200 of FIG. 8, a first growth module $100_1$ is spaced apart from and opposed to a second growth module 100₂ across an aisle 124. The aisle 124 has an aisle width 126 extending from the front column side 110 of the growth columns 106 of the first growth module 100₁ to the front column side 110 of the growth columns 106 of the second growth module 100₂. As shown, the at least one light source 118 of the grow light assembly 116 of each growth module 100 faces away from the growth columns 106 of its respective growth module 100. As a result, the light vector 120 of the grow light assembly 116 directs light emitted from the light source 118 across the aisle 124 and onto the growth columns 106 of the opposed growth module 100. The at least one light source 118 of the grow light assembly 116 of each growth module 100 is spaced apart from the front column side 110 of the opposed growth module 100 by a lighting distance 128. The lighting distance 128 may be that required to provide adequate light exposure to the opposed growth module 100.

Accordingly, in the example shown, the aisle width 126 is the sum of the lighting distance 128 and the separation distance 122.

Figure 8:
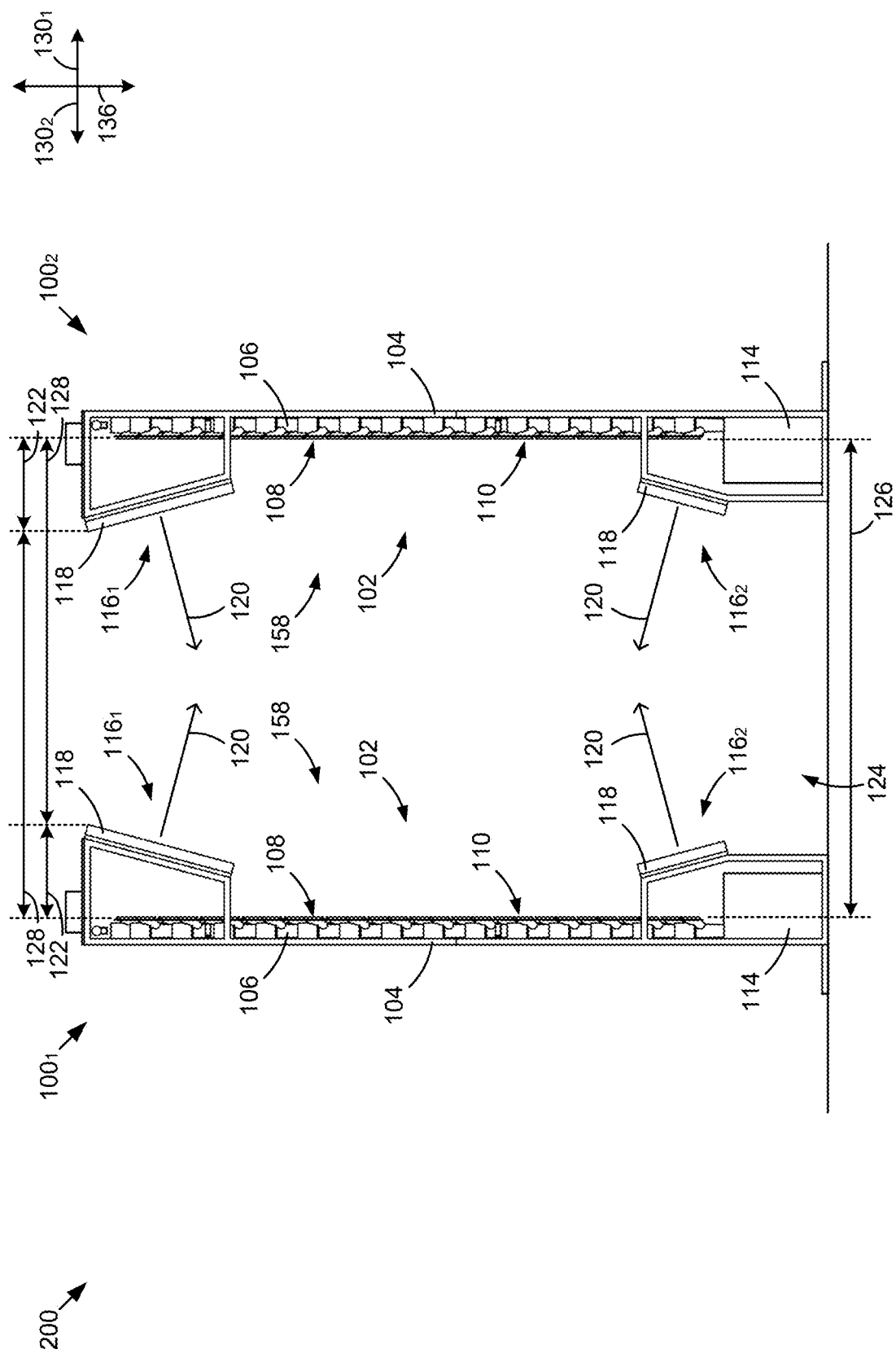
FIG. 8 is a side view of a hydroponic plant growth system with opposed hydroponic plant growth modules of FIG. 2.

As described previously, the aisle width 18 in the example vertical hydroponic system 10 in FIG. 1A must be at least two times the lighting distance 22. For example, if the lighting distance 22 needs to be at least 4 feet for adequate light distribution across the grow walls 12, the aisle width 18 must be at least 8 feet. In contrast, since the light vector 120 of each growth module 100 directs emitted light onto the growth columns 106 of the opposed growth module 100, the aisle width 126 of the growth system 200 of FIG. 8 is less than twice the lighting distance 128. In particular, in the example shown, the aisle width 126 is the sum of the lighting distance 128 and the separation distance 122 and, as shown, the separation distance 122 is less than the lighting distance 128. Since the light vector 120 of each growth module 100 directs emitted light onto the growth columns 106 of the opposed growth module 100, the growth modules 100 may be brought into close proximity (e.g., contact) with each other such the lighting distance 128 is about the separation distance 122. Therefore, in some embodiments, the aisle width 126 may be twice the separation distance 122. In other embodiments, the lighting distance 128 may be greater than the separation distance 122 to provide spacing between the growth modules 100 for a user to move between the growth modules 100. That is, in such embodiments, that lighting distance 128 and therefore the aisle width 126 may be controlled by the minimum aisle width 126 required for the user to move between, and cultivate and harvest plants 160 on, the growth modules 100.

The growth modules 100 may therefore be positioned closer together than in existing vertical hydroponic systems and the aisle width 126 may therefore be narrower. For example, the aisle width 126 may be less than 8 feet (e.g., between 1-8 feet, or more particularly 2-5 feet). Additionally, in contrast to the example vertical hydroponic system 10 in FIG. 1B, the aisle width 126 may be close to or controlled by the minimum space required for the user to move within the aisle 124 without sacrificing a row of growth modules 100.

The design of the growth module 100 and, in particular, the design of the grow light assembly 116 thereof, may therefore result in a reduced footprint for parallel opposing rows of growth modules 100 in the growth system 200. A reduced footprint may thereby increase the overall plant yield potential (i.e., yield per square foot) of the growth system 200 since a greater number of rows of growth modules 100 may fit into a given space. Further, this design may provide adequate light distribution across the growth modules 100. This may reduce or eliminate shaded areas, which may ensure that all plants 160 on the growth modules 100 photosynthesize effectively and may thereby ensure even development and improved yield without sacrificing an entire row of growth modules 100. Therefore, this design may reconcile the provision of adequate light distribution across growth modules 100 with maintaining or improving plant yield potential of the growth system 200. The advantages of this design may therefore improve productivity and profitability of a facility employing the growth system 200, which may make such facilities viable in locations where real estate is more expensive (e.g., cities).

Detailed Description of a Hydroponic Plant Growth Module, System, and Related Method Referring to FIGS. 2 and 6, the front module side 102 of the growth module 100 faces in a forward direction 130. Similarly, the front column side 110 of each growth column 106 faces in the forward direction 130. As used herein and in the claims, the forward direction 130 refers to the general direction that is defined by a normal vector of the front column side 110 (i.e., perpendicular to the front column side 110). When used with respect to the light vector 120 (see e.g., FIG. 6), the forward direction 130 may further include the range of directions defined by a set of vectors within a vertical plane that is perpendicular to the front column side 110, excluding any vectors parallel to the front column side 110. That is, the forward direction 130 may include the normal vector of the front column side 110 and all vectors that form an angle greater than 0° but less than 90° with the normal vector.

Figure 5:
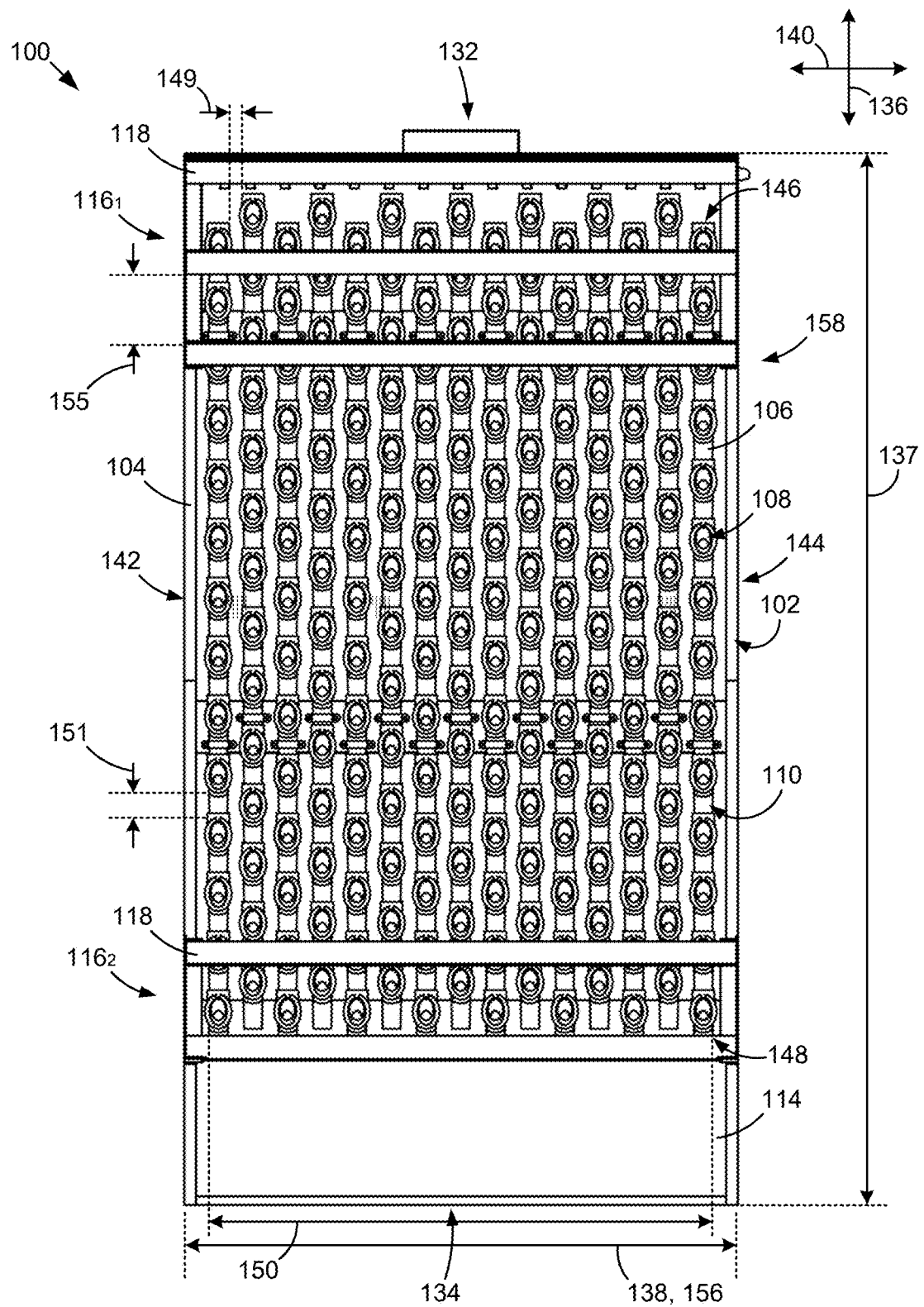
FIG. 5 is a front view of the hydroponic plant growth module of FIG. 2.

Referring to FIGS. 2 and 5, the module frame 104 has an upper frame end 132 vertically spaced apart from a lower frame end 134. That is, the module frame 104 extends in a vertical direction 136 from the lower frame end 134 to the upper frame end 132. As used herein and in the claims, the vertical direction 136 refers generally to the direction that is perpendicular to a flat, horizontal surface, typically aligned with gravity. It represents the up-and-down orientation in a three-dimensional space. Accordingly, as used herein and in the claims, "vertically extending" refers to an element that is oriented with a dimensional axis extending generally in the vertical direction 130. It will be appreciated, however, that two or more elements or reference points said to be "vertically spaced apart" as used herein and in the claims means that they are at different elevations relative to a flat, horizontal surface, with the distance between them measured in the vertical direction 130, and not necessarily that they are aligned in the vertical direction 130 along a single vertical axis.

As shown in FIG. 5, the module frame 104 has a frame height 137 extending in the vertical direction from the lower frame end 134 to the upper frame end 132. The frame height 137 may be any suitable height which may depend, for example, on the number of plants 160 desired to be supported on the growth module 100 and any height restrictions of the space in which the growth module 100 is employed. For example, the frame height 137 may be at least 4 feet (e.g., between 4-18 feet, or more particularly 6-12 feet). In some embodiments, two or more growth modules 100 may be vertically stacked. In such embodiments, the frame height 137 of the module frame 104 of each growth module 100 may be at least 4 feet (e.g., same or different frame heights between 4-18 feet, or more particularly 6-12 feet). Therefore, in such embodiments, the frame height 137 of the module frame 104 of each growth module 100 may further depend on the number of vertically stacked growth modules 100. Optionally, in such embodiments, the vertically stacked growth modules 100 may share a common nutrient delivery system or, alternatively, a common reservoir 114 with independent pumps and supply conduits 115.

As shown in FIG. 5, the module frame 104 further has a frame width 138 extending in a lateral direction 140 from a first frame side 142 to a laterally spaced apart second frame side 144. As used herein and in the claims, the lateral direction 140 refers generally to the direction that is perpendicular to the forward direction 130 and the vertical direction 136. It represents the left-and-right orientation in a three-dimensional space when viewed from the front module side 102 (i.e., the view in FIG. 5). The frame width 138 may be any suitable width which may depend, for example, on the desired number of growth columns 106 to be distributed across the frame width 138. For example, the frame width 138 may be at least 2 feet (e.g., between 2-12 feet, or more particularly 4-8 feet).

The module frame 104 may be made of any material of suitable strength to accommodate the weight of the growth columns 106, including the growth pods 112 and the plants 160 and nutrient solution-saturated growing medium 164 (if present) therein, as well as the grow light assembly 116, and any additional elements such as those of the nutrient delivery system, without sagging or structural failure. Suitable materials for the module frame 104 include, for example, aluminum, steel, plastic or composite materials, or wood.

Referring still to FIG. 5, the growth columns 106 of the growth module 100 are secured to the module frame 104 in a vertically extending orientation. That is, each growth column 106 may be secured to the module frame 104 with a longitudinal axis oriented to extend generally in the vertical direction 130 such that the growth columns 106 are generally parallel. The growth columns 106 may be secured to the module frame 104 by any suitable means such as, for example, pipe clamps, pipe straps, pipe brackets, pipe hangers, and the like.

As shown, each growth column 106 has an upper column end 146 vertically spaced apart from a lower column end 148. When secured to the module frame 104, the upper column end 146 may be positioned proximate the upper frame end 132 and the lower column end 148 may be positioned vertically above the reservoir 114. The growth columns 106 may be hollow from the upper column end 146 to the lower column end 148. In this way, nutrient solution delivered by the pump from the reservoir 114 through the supply conduit 115 may be distributed into the upper column end 146 of each growth column 106. The nutrient solution may then travel downwardly through each hollow growth column 106 from the upper column end 146 and over each growth pod 112 positioned in a growth pod port 108 of the growth column 106. Excess solution may subsequently exit the lower column end 148 to drain back into the reservoir 114 for reuse. The growth columns 106 may have any diameter allowing sufficient depth for supporting the growth pods 112 inserted into the growth columns 106 through the growth pod ports 108. For example, the diameter of the growth columns 106 may be at least 1 inch (e.g., between 1-6 inches, or more particularly 1-2 inches).

The growth columns 106 may be made of any suitable material. Suitable materials may be materials that are durable, non-reactive, and resistant to corrosion or degradation from water and nutrients. Accordingly, suitable materials for the growth columns 106 include, for example, polyvinyl chloride (PVC), polyethylene (PE), acrylonitrile butadiene styrene (ABS), stainless steel, and silicone or rubber.

Referring still to FIG. 5, the growth columns 106 are distributed across the module frame 104 in the lateral direction 140. That is, the growth columns 106 are distributed across the frame width 138. The growth columns 106 are spaced apart in the lateral direction 140 by a column spacing 149 (i.e., the gap between the closest points of adjacent growth columns). The column spacing 149 may ensure sufficient airflow and light penetration between plants 160 supported on adjacent growth columns 106. Any suitable column spacing 149 may be used which may depend, for example, on the size/type of plants 160 to be grown on the growth module 100 and the diameter of the growth columns 106. For example, where the diameter of the growth columns 106 provides sufficient spacing between plants 160 on adjacent growth columns 106 (e.g., due to a larger diameter of growth column relative to the size of the plant being grown), the column spacing 149 may be 0 (i.e., adjacent growth columns may be touching). The growth columns 106 may therefore have a column spacing 149 of, for example, between 0-11 inches, or more particularly 1-3 inches. The plurality of growth columns 106 may collectively have a column width 150 in the lateral direction 140. The column width 150 may be less than the frame width 138.

Any number of growth columns 106 may be used which may depend, for example, on the diameter of the growth columns 106, the column spacing 149, and the frame width 138. For example, the growth module 100 may have at least 6 growth columns 106 (e.g., 6-24, or more particularly 10-15).

Referring to FIGS. 2 and 3, each growth column 106 has a plurality of growth pod ports 108 in the front column side 110 of the growth column 106 and vertically distributed along the growth column 106. The growth pod ports 108 provide access to the hollow interior of the growth column 106. As shown in the enlarged view of FIG. 3, the growth pod ports 108 are each shaped to receive a growth pod 112, which may be removably mounted in the growth pod port 108. When mounted, the growth pod 112 may extend into the hollow growth column 106 from the growth pod port 108. The growth pod port 108 may support the growth pod 112, and the plant 160 and optional growing medium 164 therein, on the growth module 100 throughout the growth cycle of the plant 160. In this way, the growth pod ports 108 and growth pods 112 together provide the plants 160 of the growth module 100 with access to the nutrient solution flowing through the growth columns 106.

The vertical distribution of the growth pod ports 108 along the growth columns 106 makes efficient use of space by stacking multiple layers of plants 160. This may allow for a large number of plants 160 to be grown in a relatively small footprint. As shown in FIG. 5, the growth pod ports 108 of each growth column 106 are vertically spaced apart by a port spacing 151 (i.e., the vertical gap between adjacent growth pod ports 108). The port spacing 151 may ensure proper airflow and light penetration between plants 160 supported on the same growth column 106. Any suitable port spacing 151 may be used which may depend, for example, on the size/type of plants 160 to be grown on the growth module 100 and the number of plants 160 desired to be supported per growth column 106. For example, the port spacing 151 may be at least 2 inches (e.g., between 2-12 inches, or more particularly 4-6 inches). Additionally, as shown, the growth pod ports 108 of adjacent growth column 106 may be vertically offset or staggered. This may avoid overcrowding of foliage across a given elevation on the growth module 100. This may further ensure sufficient airflow and light penetration between plants 160 supported on adjacent growth columns 106.

Any number of growth pod ports 108 may be used which may depend, for example, on the diameter of the growth pod ports 108, the port spacing 151, and the height of the growth columns 106. For example, each growth column 106 may have at least 10 growth pod ports 108 (e.g., between 10-15). The growth module 100 may have any total number of growth pod ports 108 depending on the number of growth columns 106 and the number of growth pod ports 108 per growth column 106. For example, the growth module 100 may have at least 80 total growth pod ports 108 (e.g., between 80-500, or more particularly 150-250).

Growth pods 112 may include typical containers such as net cups or, as shown in FIG. 3, specially designed slotted pods that can be mounted in the growth pod ports 108. Each growth pod 112 may hold a plant 160 (e.g., leafy greens, herbs, fruiting vegetables, microgreens, sunflower greens, flowers and ornamentals, or root crops) and, optionally, a growing medium 164 (e.g., peat moss, perlite, coconut coir, rock wool, hydroton, or vermiculite), which may support the roots 162 of the plant 160 while also allowing them to access a nutrient solution delivered by a nutrient delivery system of the growth module 100. The growth pods 112 may be made of any suitable material. Suitable materials may be materials that are durable, water-resistant, and lightweight. Such properties may be advantageous for growth pods 112, as they need to hold plants 160 and optionally growing medium 164 and need to withstand environmental conditions like consistent moisture and UV exposure. For example, growth pods 112 may be made of fabric, plastic, fiberglass, or wood.

Referring to FIGS. 2, 5, and 6, the growth module 100 may have one or more grow light assemblies 116. Each grow light assembly 116 may be positioned outwardly of the growth columns 106 in the forward direction 130. For example, in the embodiment shown, the growth module 100 has an upper grow light assembly $116_1$ and a lower grow light assembly $116_2$. As shown, the upper grow light assembly $116_1$ is secured to the module frame 104 proximate the upper frame end 132. The upper grow light assembly $116_1$ is positioned outwardly of the growth columns 106 in the forward direction 130 at the upper column end 146. As shown, the lower grow light assembly $116_2$ is secured to the module frame 104 proximate the lower frame end 134. The lower grow light assembly $116_2$ is positioned outwardly of the growth columns 106 in the forward direction 130 at the lower column end 148.

In a hydroponic plant growth system, such as the growth system 200 of FIG. 8, the use of an upper grow light assembly $116_1$ and a lower grow light assembly $116_2$ may advantageously improve light coverage across the front column side 110 of the growth columns 106 of the opposed growth module 100. For example, that addition of the lower grow light assembly $116_2$ may ensure that each plant on the opposed growth module 100 receives adequate light exposure. That is, the lower grow light assembly $116_2$ may reduce shadowing on plants 160 proximate the lower column end 148 of the growth columns 106 of the opposed growth module 100 that might otherwise be more shaded from light emitted from the upper grow light assembly $116_1$ alone. It may also reduce shadowing on the bottom of plants 160 on the opposed growth module 100 that might otherwise be more shaded from light emitted from the upper grow light assembly $116_1$ alone. Conversely, the upper grow light assembly $116_1$ may reduce shadowing on plants 160 proximate the upper column end 146 of the growth columns 106 of the opposed growth module 100 that might otherwise be more shaded from light emitted from the lower grow light assembly $116_2$ alone. It may also reduce shadowing on the top of plants 160 on the opposed growth module 100 that might otherwise be more shaded from light emitted from the lower grow light assembly $116_2$ alone.

Referring to FIGS. 5 and 6, each grow light assembly 116 may have an upper light assembly end 152 vertically spaced apart from a lower light assembly end 154. Each grow light assembly 116 may further have at least one light source 118. The at least one light source 118 may be positioned between the upper light assembly end 152 and the lower light assembly end 154. Optionally, a grow light assembly 116 may have at least two vertically spaced apart light sources 118. The light sources 118 may be spaced apart in the vertical direction 136 by a light spacing 155. The light sources 118 may be distributed between the upper light assembly end 152 and the lower light assembly end 154. Any number of light sources 118 may be used. For example, in the illustrated embodiment, the upper grow light assembly $116_1$ has three vertically spaced apart light sources 118 distributed between the upper and lower light assembly ends 152, 154. The lower grow light assembly $116_2$ has two vertically spaced apart light sources 118 distributed between the upper and lower light assembly ends 152, 154.

A grow light assembly 116 may have any height in the vertical direction 136 which may depend, for example, on the number of grow light assemblies 116, the number of light sources 118 thereof, and the light spacing 155. For example, a single grow light assembly 116 may extend from the lower light assembly end 154 at or below the elevation of the lower column end 148 of the plurality of growth columns 106 to the upper light assembly end 152 at or above the elevation of the upper column end 146 of the plurality of growth columns 106. In this way, a single growth module 116 may have a plurality of light sources 118 vertically distributed from about the lower column end 148 of the plurality of growth columns 106 to the about upper column end 146 of the plurality of growth columns 106.

Where a grow light assembly 116 has more than one light source 118, vertically spacing the light sources 118 apart from each other may advantageously allow light penetration between the light sources 118 to the plants 160 behind the grow light assembly 116. In this way, in a hydroponic plant growth system such as the growth system 200 of FIG. 8, each grow light assembly 116 may be positioned in front of the growth columns 106 in the forward direction 130 without significantly obstructing light exposure from light emitted by each grow light assembly 116 of the opposed growth module 100. Any light spacing 155 between light sources 118 of a grow light assembly 116 in the vertical direction 136 may be used. For example, the light spacing 155 may be at least 4 inches (e.g., between 4-12 inches, or more particular 4-8 inches).

Referring still to FIG. 6, where a grow light assembly 116 has more than one light source 118, each light source 118 of the grow light assembly 116 may be forwardly spaced apart from the front column side 110 of the growth columns 106 by a separation distance 122. The separation distance 122 may be chosen to provide sufficient clearance for plants 160 behind the grow light assembly 116 to grow freely without reaching the light sources 118. Any suitable separation distance 122 may be possible. For example, the separation distance 122 of each light source 118 from the front column side 110 of the growth columns 106 may be at least 3 inches (e.g., 3-45 inches, or more particularly 3-12 inches). At least one of the light spacing 155 and the separation distance 122 may be sufficiently dimensioned to enable access to the growth pod ports 108 and any plants 160 supported therein that are behind each grow light assembly 116.

In some embodiments, the separation distance 122 may be the same for each light source 118. That is, the light sources 118 may be spaced apart in the vertical direction 136 along a common vertical axis. In such embodiments, the light vector 120 of the grow light assembly 116 may be extend generally in the forward direction 130 at an angle θ that is perpendicular to the front column side 110 of the growth columns 106. In alternate embodiments, the separation distance 122 may be different for each light source 118. That is, the light sources 118 may be spaced apart in the vertical direction 136 with each light source 118 positioned a different separation distance 122 from the front column side 110 of the growth columns 106. In such embodiments, the light vector 120 of the grow light assembly 116 may extend generally in the forward direction 130 at an acute angle θ to the front column side 110 of the growth columns 106. Any angle θ may be possible. For example, the light vector 120 may extend generally in the forward direction 130 at an angle θ of between 45-degrees and 90-degrees (e.g., between 60-degrees and 90-degrees, or more particularly 70-degrees and 80-degrees) to the front column side 110 of the growth columns 106. Stated another way, the light vector 120 may extend generally in the forward direction 130 at an angle θ of between 45-degrees and 90-degrees (e.g., between 60-degrees and 90-degrees, or more particularly 70-degrees and 80-degrees) to the vertical direction 136. Stated yet another way, the light vector 120 may extend generally in the forward direction 130 within 45-degrees (e.g., within 30-degrees, or more particularly within 20-degrees) of the forward direction 130 (i.e., of the normal vector of the front column side 110 that defines the forward direction 130). The angle may depend, for example, on the spacing of the grow light assembly 116 from an opposed growth module 100.

For example, in the embodiment illustrated in FIG. 6, each light source 118 of the upper grow light assembly $116_1$ is positioned at a different separation distance 122 from the front column side 110 of the growth columns 106. As shown, the separation distance 122 decreases from the upper light assembly end 152 to the lower light assembly end 154. That is, the light source 118 closest to the upper light assembly end 152 has the greatest separation distance 122 and the light source 118 closest to the lower light assembly end 154 has the smallest separation distance 122. In this way, the light vector 120 of the upper grow light assembly 1161 extends generally in the forward direction 130 at a downward angle θ1. As shown, the downward angle θ1 may be an acute angle of at least 45-degrees (e.g., at least 60-degrees, or more particularly between 70-degrees to 80-degrees) to the front column side 110 of the growth columns 106 (or, alternatively stated, to the vertical direction 136) in the forward direction 130. Stated another way, the downward angle θ1 may be within 45-degrees (e.g., within 30-degrees, or more particularly within 20-degrees) vertically downward of the forward direction 130 (i.e., of the normal vector of the front column side 110 that defines the forward direction 130).

Similarly, in the illustrated embodiment, each light source 118 of the lower grow light assembly $116_2$ is positioned at a different separation distance 122 from the front column side 110 of the growth columns 106. As shown, the separation distance 122 increases from the upper light assembly end 152 to the lower light assembly end 154. That is, the light source 118 closest to the upper light assembly end 152 has the smallest separation distance 122 and the light source 118 closest to the lower light assembly end 154 has the greatest separation distance 122. In this way, the light vector 120 of the lower grow light assembly $116_2$ extends generally in the forward direction 130 at an upward angle $θ_2$. As shown, the upward angle $θ_2$ may be an acute angle of at least 45-degrees (e.g., at least 60-degrees, or more particularly between 70-degrees to 80-degrees) to the front column side 110 of the growth columns 106 (or, alternatively stated, to the vertical direction 136) in the forward direction 130. Stated another way, the upward angle $θ_2$ may be within 45-degrees (e.g., within 30-degrees, or more particularly within 20-degrees) vertically upward of the forward direction 130 (i.e., of the normal vector of the front column side 110 that defines the forward direction 130).

A grow light assembly 116 configured in accordance with this disclosure may have a light vector 120 that directs at least 75% (or more particularly at least 85%, 95%, up to 100%) of light emitted from the at least one light source 118 outwardly away from the growth columns 106 in the forward direction 130. In this way, in a hydroponic plant growth system such as growth system 200 of FIG. 8, the growth system 200 is characterized by reciprocal lighting in which the light vector(s) 120 of each growth module 100 direct at least 75% of light emitted from the at least one light source 118 outwardly away from the growth columns 106 of its respective growth module 100 in the forward direction 130 toward the growth columns 106 of the opposed growth module 100. Each growth module 100 thus relies upon the grow light assembly 116 of the opposed growth module 100 to illuminate its growth columns 106. In this way, the grow light assembly 116 of each growth module 100 in growth system 200 may deliver the essential light spectrum and exposure to plants 160 on the opposed growth module 100 required to support optimal plant growth and may rely upon the opposed growth module 100 to provide the same.

Optionally, the grow light assembly 116 may include reflectors. Since light emitted from the light sources 118 can scatter in various directions, reflectors may be included to redirect this light in the forward direction 120 toward the opposed grow wall 100. This may reduce light waste and may ensure that more of the emitted light is utilized for photosynthesis. This may therefore increase the overall efficiency of the grow light system.

Referring to FIG. 5, the grow light assembly 116 may have an assembly width 156 extending across the module frame 104 in the lateral direction 140. Each light source 118 of the grow light assembly 116 may extend across the assembly width 156 in the lateral direction 140. The assembly width 156 of the grow light assembly 116 may be at least 75% (or more particularly at least 85%, 95%, or 100%) of the column width 150. For example, in the illustrated embodiment, the assembly width 156 of the grow light assembly 116 is at least 100% of the column width 150. In particular, in the illustrated embodiment, the assembly width 156 is 100% of the frame width 138, which is greater than 100% of the column width 150. Increasing the assembly width 156 of the grow light assembly 116 relative to the column width 150 of the collective plurality of growth columns 106 may ensure optimal light exposure for each growth column 106 distributed across the module frame 104 between the first frame side 142 and the second frame side 144.

Each light source 118 may be in the range of 5 watts to 250 watts per foot of the assembly width 156 (or more particularly 5 watts to 150 watts per foot of the assembly width 156, or 25 watts to 75 watts per foot of the assembly width 156). The selected wattage of each light source 118 may depend, for example, on factors such as the number of light sources 118 of the grow light assembly 116, the spacing of the light sources 118 from the opposed growth module 100, the light spectrum provide by the light sources 118, and the specific lighting needs of the plants 160 on the opposed growth module 100. For example, in the illustrated embodiment, the upper grow light assembly $116_1$ may have three light sources 118 at 25 watts per foot of the assembly width 156 and the lower grow light assembly $116_2$ may have two light sources 118 at 25 watts per foot of the assembly width 156. Optionally, the upper grow light assembly $116_1$ may be modified to have one light source 118 at 75 watts per foot of the assembly width 156 and the lower grow light assembly $116_2$ may be modified to have one light source 118 at 50 watts per foot of the assembly width 156 while providing the same light intensity. Accordingly, any number of light sources 118 having any collective wattage per foot may be used.

In some embodiments, each light source 118 may be adjustable. For example, each light source 118 may be dimmable. A dimmable light source 118 may advantageously allow for customized light intensity. During different stages of plant growth, such as seedling, vegetative, and flowering phases, plants require varying levels of light intensity. A light source 118 may therefore be dimmed to adjust the intensity to match the plant's specific needs at each stage. This may ensure optimal growth without overexposing them. Additionally, a dimmable light source 118 may help simulate natural light transitions by gradually adjusting light levels, mimicking the natural rising and setting of the sun. This gradual change may improve plant health and help maintain a more consistent, stress-free growing environment. A dimmable light source 118 may also contribute to energy efficiency by reducing power consumption during periods when less light is required, such as during the early growth stages. As another example, each light source 118 may be tunable. A tunable light source 118 may advantageously allow for customized light spectrum. That is, a tunable light source 118 can adjust the spectrum to provide specific wavelengths that support different plant growth stages. For example, during the vegetative growth phase, plants need more blue light to build strong structures. When plants enter the flowering or fruiting stage, they require more red light to trigger blooming and fruit production.

The light source 118 of the grow light assembly 116 may be any suitable grow light source. For example, the light source 118 may be LED, fluorescent, high-pressure sodium (HPS), metal halide (MH), or light emitting plasma (LEP) lights. In the illustrated embodiment, each light source 118 of the grow light assembly 116 is an LED light source 118, shown as a strip of LED grow lights. An LED light source 118 offers various advantages including energy efficiency, long lifespan, and less heat production compared to HPS or MH lights, which may reduce the need for cooling systems and allow the light source 118 to be positioned closer to the plants 160 on the growth module 100 without risking heat stress or damage. An LED light source 118 is also adjustable. That is, an LED light source 118 is dimmable and also has the ability to produce specific light spectrums, which can be fine-tuned to emit the necessary wavelengths of light, needed for different growth stages. Since a full-spectrum LED light source 118 can emit both blue and red wavelengths, along with other beneficial spectrums, plant growth may be optimized by fine-tuning the wavelengths of light emitted from the LED light source 118, which may lead to healthier plants and higher yields throughout the entire growth cycle.

The plurality of growth columns 106 and the grow light assembly 116 may be collectively referred to as a plant growth subassembly 158. In the embodiment illustrated in FIGS. 2-6, the growth module 100 includes one plant growth subassembly 158 provided at the front module side 102. Optionally, the plant growth subassembly 158 may be a first plant growth subassembly $158_1$, and the growth module 100 may further include a second plant growth subassembly $158_2$ provided at another side of the growth module 100 opposite to the front module side 102. In such embodiments, the front module side 102 may be a first front module side $102_1$ facing in a first forward direction $130_1$, and the side of the growth module 100 opposite to the first front module side $102_1$ may be a second front module side $102_2$ facing in a second forward direction $130_2$. The second forward direction $130_2$ may be opposite to the first forward direction $130_1$.

Figure 7:
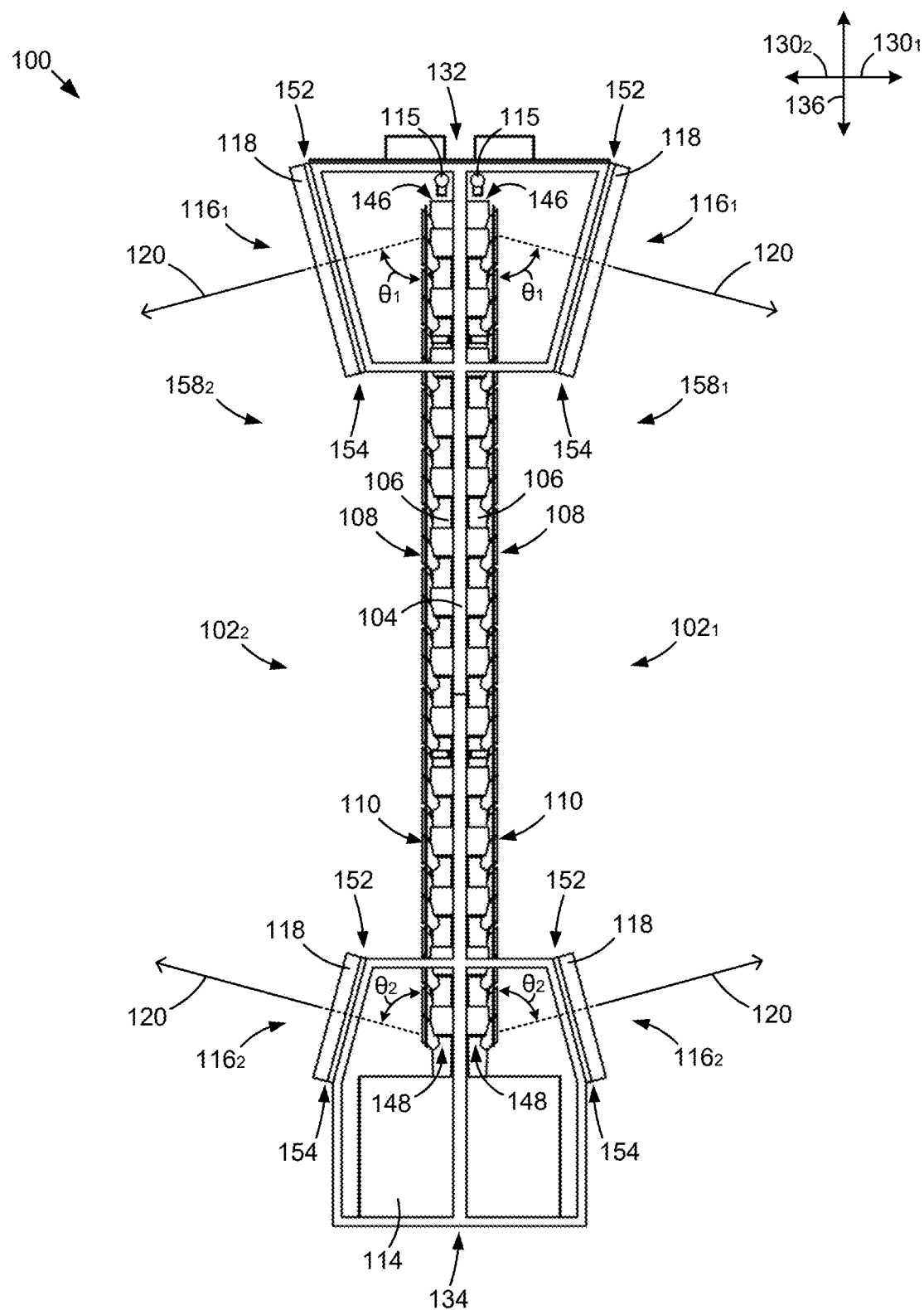
FIG. 7 is a side view of the hydroponic plant growth module of FIG. 2 with two plant growth subassemblies.

For example, referring to FIG. 7, the growth module 100 has a first front module side $102_1$ facing in a first forward direction $130_1$ and a second front module side $102_2$ facing in a second forward direction $130_2$ that is opposite to the first forward direction $130_1$. As shown, the growth module 100 includes a first plant growth subassembly $158_1$ provided at the first front module side $102_1$ and a second plant growth subassembly $158_2$ provided at the second front module side $102_2$. It will be appreciated that the plurality of growth columns 106 and the grow light assembly 116 of the second plant growth subassembly $158_2$ may be configured similarly to those of the first plant growth subassembly $158_1$, simply facing in the opposite direction (i.e., the second forward direction $130_2$). Accordingly, a description of the second plant growth subassembly $158_2$ is omitted for brevity.

Two or more growth modules 100 in accordance with the embodiments described herein may be arranged to form a hydroponic plant growth system. The number of rows of growth modules 100, the types of growth modules 100 forming each row, and the number of growth modules 100 in each row, may depend, for example, on the square footage available in a given space intended to establish the growth system. Optionally, adjacent growth modules 100 in a given row may be electrically connected to place the light sources 118 on the same lighting circuit and/or to render the light sources 118 operable (e.g., on/off, dimming, tuning) by a common controller.

For example, in the embodiment illustrated in FIG. 8, the growth system 200 includes two rows of growth modules 100. In the view shown, the growth system 200 includes a first growth module $100_1$ spaced apart from and opposed to a second growth module $100_2$.

As shown, the front module side 102 of the first growth module $100_1$ is oriented to face in a first forward direction $130_1$ toward the front module side 102 of the second growth module $100_2$. Conversely, the front module side 102 of the second growth module $100_2$ is oriented to face in a second forward direction $130_2$ opposite the first forward direction $130_1$ toward the front module side 102 of the first growth module $100_1$. Accordingly, the front column side 110 of the growth columns 106 of the plant growth subassembly 158 of the first growth module $100_1$ faces in the first forward direction $130_1$ and the front column side 110 of the growth columns 106 of the plant growth subassembly 158 of the second growth module $100_2$ faces in the second forward direction $130_2$. The grow light assembly 116 of the first growth module $100_1$ is positioned outwardly of the growth columns 106 in the first forward direction $130_1$ and the light vector 120 of the grow light assembly 116 directs light emitted from the at least one light source 118 outwardly away from the growth columns 106 in the first forward direction $130_1$ toward the front module side 102 of the second growth module $100_2$. Similarly, the grow light assembly 116 of the second growth module $100_2$ is positioned outwardly of the growth columns 106 in the second forward direction $130_2$ and the light vector 120 of the grow light assembly 116 directs light emitted from the at least one light source 118 outwardly away from the growth columns 106 in the second forward direction $130_2$ toward the front module side 102 of the first growth module $100_1$. Accordingly, in the growth system 200 of FIG. 8, the first and second growth modules 100 provide reciprocal lighting to each other.

Figure 9:
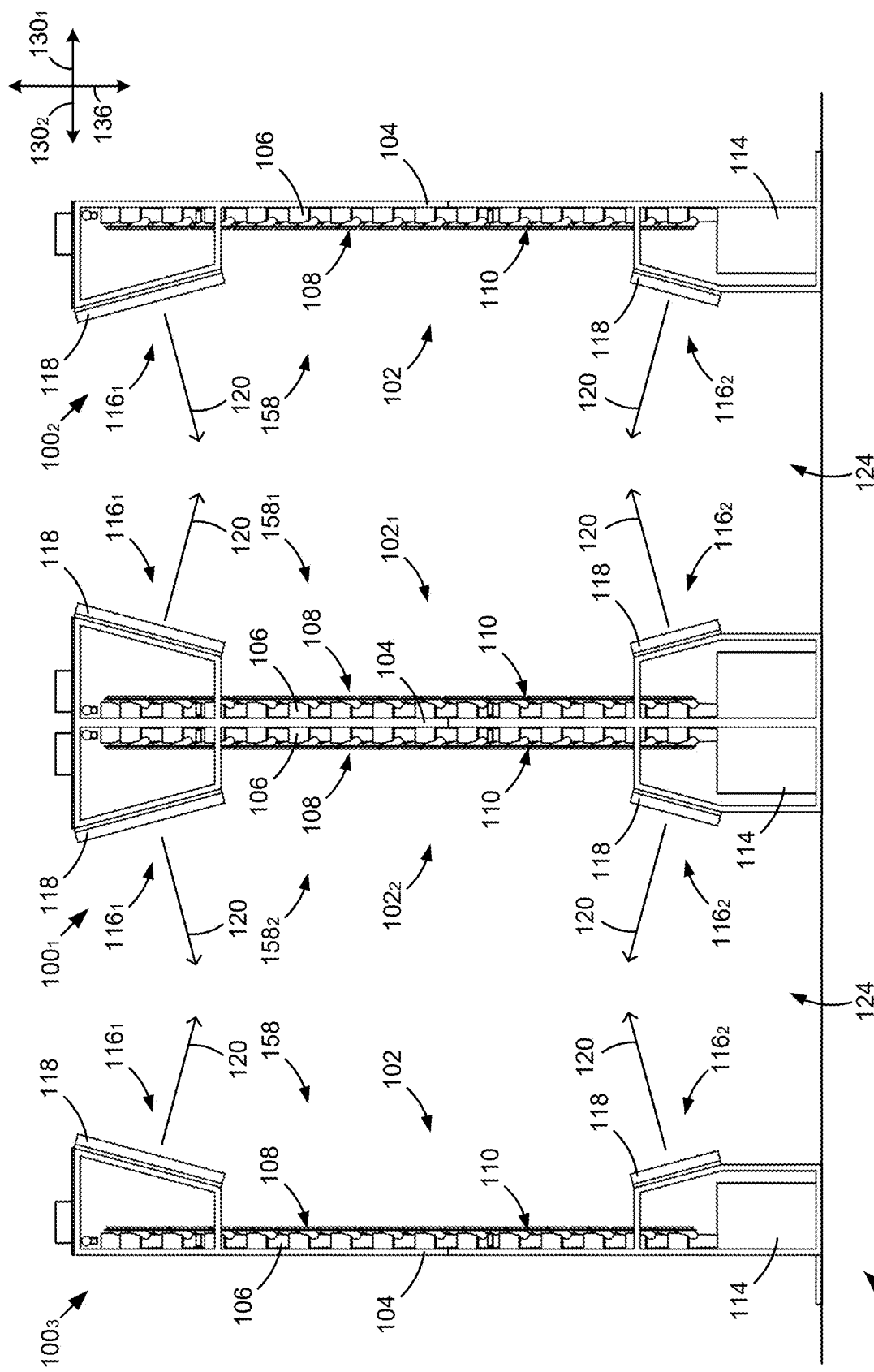
FIG. 9 is a side view of a hydroponic plant growth system with the hydroponic plant growth module of FIG. 7 flanked by two hydroponic plant growth modules of FIG. 2.

As another example, referring to FIG. 9, the growth system 200 has been scaled up to include a third row of growth modules 100. In the view shown, the growth system 200 includes the first growth module $100_1$, the second growth module $100_2$ spaced apart from and opposed to the first front module side $102_1$ of the first growth module $100_1$, and a third growth module $100_3$ spaced apart from and opposed to a second front module side $102_2$ of the first growth module $100_1$. As shown, the first front module side $102_1$ of the first growth module $100_1$ is oriented to face in the first forward direction $130_1$ toward the front module side 102 of the second growth module $100_2$ and the second front module side $102_2$ of the first growth module $100_1$ is oriented to face in the second forward direction $130_2$ opposite the first forward direction $130_1$ toward a front module side 102 of the third growth module $100_3$. Conversely, the front module side 102 of the second growth module $100_2$ is oriented to face in the second forward direction $130_2$ toward the first front module side $102_1$ of the first growth module $100_1$ and the front module side 102 of the third growth module $100_3$ is oriented to face in the first forward direction $130_1$ toward the second front module side $102_2$ of the first growth module $100_1$.

In the illustrated embodiment, the first growth module $100_1$ includes a first plant growth subassembly $158_1$ provided at the first front module side $102_1$ and a second plant growth subassembly $158_2$ provided at the second front module side $102_2$. The first plant growth subassembly $158_1$ of the first growth module $100_1$ and the plant growth subassembly 158 of the second growth module $100_2$ are configured similarly to the plant growth subassemblies 158 of the first and second growth modules 100 described with respect to FIG. 8. The second plant growth subassembly $158_2$ of the first growth module $100_1$ and the plant growth subassembly 158 of the third growth module $100_3$ are also configured similarly. Accordingly, the front column side 110 of the growth columns 106 of the second plant growth subassembly $158_2$ of the first growth module $100_1$ faces in the second forward direction $130_2$ and the front column side 110 of the growth columns 106 of the plant growth subassembly 158 of the third growth module $100_3$ faces in the first forward direction $130_1$. The grow light assembly 116 of second plant growth subassembly $158_2$ of the first growth module $100_1$ is positioned outwardly of the growth columns 106 in the second forward direction $130_2$ and the light vector 120 of the grow light assembly 116 directs light emitted from the at least one light source 118 outwardly away from the growth columns 106 in the second forward direction $130_2$ toward the front module side 102 of the third growth module $100_3$. Similarly, the grow light assembly 116 of the third growth module $100_3$ is positioned outwardly of the growth columns 106 in the first forward direction $130_1$ and the light vector 120 of the grow light assembly 116 directs light emitted from the at least one light source 118 outwardly away from the growth columns 106 in the first forward direction $130_1$ toward the second front module side $102_2$ of the first growth module $100_1$. Accordingly, in the growth system 200 of FIG. 9, the first and second growth modules 100 provide reciprocal lighting to each other and the first and third growth modules 100 provide reciprocal lighting to each other.

In accordance with another aspect of this disclosure, there is provided a method of growing plants using a hydroponic plant growth system, such as using the example growth systems 200 of FIGS. 8 and 9. The method includes emitting light from a grow light source 118 of a first growth module 1001 outwardly away from a front module side 102 of the first growth module $100_1$ in a first forward direction $130_1$ to illuminate a front module side 102 of a second growth module $100_2$, where the front module side 102 of the second growth module $100_2$ is spaced apart from and facing the front module side 102 of the first growth module $100_1$. The method further includes emitting light from a grow light source 118 of the second growth module $100_2$ outwardly away from the front module side 102 of the second growth module $100_2$ in a second forward direction $130_2$ to illuminate the front module side 102 of the first growth module $100_1$, where the second forward direction $130_2$ is opposite to the first forward direction $130_1$.

Emitting light from the grow light source 118 of the first growth module $100_1$ may include directing a light vector 120 of the grow light source 118 at an angle of between 45-degrees and 90-degrees to the front module side 102 of the first growth module $100_1$ in the first forward direction $130_1$. Similarly, emitting light from the grow light source 118 of the second growth module $100_2$ may include directing a light vector 120 of the grow light source 118 at an angle of between 45-degrees and 90-degrees to the front module side 102 of the second growth module $100_2$ in the second forward direction $130_2$. Any angle of the light vector(s) 120 as described herein may be used. The angle of the light vector(s) 120 may be alternatively understood with reference to the vertical direction 136 and the normal vector defining the forward direction 130 as described herein.

Emitting light from the grow light source 118 of the first growth module $100_1$ may include directing at least 75% of light emitted from the grow light source 118 toward the front module side 102 of the second growth module $100_2$. Similarly, emitting light from the grow light source 118 of the second growth module $100_2$ may include directing at least 75% of light emitted from the grow light source 118 toward the front module side 102 of the first growth module $100_1$. Any other percentage of light emitted from the grow light source(s) 118 of one growth module 100 and directed at the opposed growth module 100 as described herein may be used.

The method further includes irrigating a plurality of plants 160 having roots 162 at a plurality of growth pod ports 108 in the front module side 102 of the first growth module $100_1$ and irrigating a plurality of plants 160 having roots 162 at a plurality of growth pod ports 108 in the front module side 102 of the second growth module $100_2$. Irrigation may be performed via the nutrient delivery system described previously herein.

The method can further include positioning a plurality of growth pods 112 (see e.g., FIG. 3) in the plurality of growth pod ports 108 in the front module side 102 of the first growth module $100_1$ and positioning another plurality of growth pods 112 in the plurality of growth pod ports 108 in the front module side 102 of the second growth module $100_2$. Each growth pod 112 of each plurality of growth pods 112 can contain one of the plurality of plants 160 of the respective growth module 100.

Optionally, each growth pod 112 of each plurality of growth pods 112 can further contain a growing medium 164. Any suitable growing medium 164 may be used such as, for example, peat moss, perlite, coconut coir, rock wool, hydroton, or vermiculite. A suitable growing medium 164 may provide mechanical support to the plants 160, helping them stay upright and secure and help to anchor the plant roots 162. A suitable growing medium 164 may also retain water and nutrients delivered by the nutrient delivery system, which may ensure that the plant roots 162 have access to these essential elements. A suitable growing medium 164 may also allow air to circulate around the roots 162, which may prevent them from becoming waterlogged and ensuring they get the oxygen they need for healthy growth.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1. A hydroponic plant growth module, comprising:
 a front module side facing in a forward direction,
 a module frame having an upper frame end vertically spaced apart from a lower frame end, and
 a plant growth subassembly positioned at the front module side of the growth module, the plant growth subassembly including
  a plurality of vertically extending growth columns secured to the module frame, the plurality of growth columns being distributed across the module frame in a lateral direction, each growth column having
   a front column side facing in the forward direction, and
   a plurality of growth pod ports in the front column side and vertically distributed along the growth column, and
  a grow light assembly positioned outwardly of the growth columns in the forward direction, the grow light assembly having
   at least one light source, and
   a light vector that directs at least 75% of light emitted from the at least one light source outwardly away from the growth columns in the forward direction.

Item 2. The hydroponic plant growth module of any other item, wherein the light vector is at an angle of between 45-degrees and 90-degrees to the growth columns in the forward direction.

Item 3. The hydroponic plant growth module of any other item, wherein the light vector directs at least 95% of light emitted from the at least one light source outwardly away from the growth columns in the forward direction.

Item 4. The hydroponic plant growth module of any other item, wherein each light source of the grow light assembly comprises a strip of LED grow lights extending in the lateral direction.

Item 5. The hydroponic plant growth module of any other item, wherein the at least one light source of the grow light assembly comprises at least two vertically spaced apart light sources.

Item 6. The hydroponic plant growth module of any other item, wherein the grow light assembly is a lower grow light assembly positioned outwardly of the growth columns in the forward direction proximate the lower frame end and the growth module further comprises an upper grow light assembly positioned outwardly of the growth columns in the forward direction proximate the upper frame end.

Item 7. The hydroponic plant growth module of any other item, wherein the light vector of the lower grow light assembly is at an upward angle of between 45-degrees and 90-degrees to the growth columns in the forward direction and a light vector of the upper grow light assembly is at a downward angle of between 45-degrees and 90-degrees to the growth columns in the forward direction.

Item 8. The hydroponic plant growth module of any other item, wherein the lower grow light assembly comprises two vertically spaced apart light sources and the upper grow light assembly comprises three vertically spaced apart light sources, each light source extending in the lateral direction.

Item 9. The hydroponic plant growth module of any other item, wherein the plurality of growth columns collectively have a column width in the lateral direction, the grow light assembly has an assembly width in the lateral direction, and the assembly width is at least 75% of the column width.

Item 10. The hydroponic plant growth module of any other item, wherein the front module side is a first front module side, the forward direction is a first forward direction, the plant growth subassembly is a first plant growth subassembly, and the growth module further comprises:
 a second front module side facing in a second forward direction opposite to the first forward direction, the second front module side having a second plant growth subassembly including
  a plurality of vertically extending growth columns secured to the module frame, the plurality of growth columns being distributed across the module frame in the lateral direction, each growth column having
   a front column side facing in the second forward direction, and
   a plurality of growth pod ports in the front column side and vertically distributed along the growth column, and
  a grow light assembly positioned outwardly of the growth columns in the second forward direction, the grow light assembly having
   at least one light source, and
   a light vector that directs at least 75% of light emitted from the at least one light source outwardly away from the growth columns in the second forward direction.

Item 11. A hydroponic plant growth system, comprising:
    a first growth module spaced apart from and opposed to a second growth module, the first growth module having
        a front module side oriented to face in a first forward direction toward a front module side of the second growth module,
        a module frame having an upper frame end vertically spaced apart from a lower frame end, and
        a plant growth subassembly positioned at the front module side, the plant growth subassembly including
            a plurality of vertically extending growth columns secured to the module frame, the plurality of growth columns being distributed across the module frame in a lateral direction, each growth column having
                a front column side facing in the first forward direction, and
                a plurality of growth pod ports in the front column side and vertically distributed along the growth column, and
            a grow light assembly positioned outwardly of the growth columns in the first forward direction, the grow light assembly having
                at least one light source, and
                a light vector that directs at least 75% of light emitted from the at least one light source outwardly away from the growth columns in the first forward direction toward the front module side of the second growth module.

Item 12. The hydroponic plant growth module of any other item, wherein the front module side of the second growth module is oriented to face in a second forward direction toward the front module side of the first growth module, the second forward direction being opposite to the first forward direction.

Item 13. The hydroponic plant growth module of any other item, wherein the second growth module has
    a module frame having an upper frame end vertically spaced apart from a lower frame end,
    a plant growth subassembly positioned at the front module side, the plant growth subassembly including
        a plurality of vertically extending growth columns secured to the module frame, the plurality of growth columns being distributed across the module frame in the lateral direction, each growth column having
            a front column side facing in the second forward direction, and
            a plurality of growth pod ports in the front column side and vertically distributed along the growth column, and
        a grow light assembly positioned outwardly of the growth columns in the second forward direction, the grow light assembly having
            at least one light source, and
            a light vector that directs at least 75% of light emitted from the at least one light source outwardly away from the growth columns in the second forward direction toward the front module side of the first growth module.

Item 14. The hydroponic plant growth module of any other item, further comprising a third growth module spaced apart from and opposed to the first growth module, wherein the front module side of the first growth module is a first front module side, the plant growth subassembly of the first growth module is a first plant growth subassembly, and the first growth module further has
    a second front module side oriented to face in the second forward direction toward a front module side of the third growth module, and
    a second plant growth subassembly positioned at the second front module side, the second plant growth subassembly including
        a plurality of vertically extending growth columns secured to the module frame, the plurality of growth columns being distributed across the module frame in the lateral direction, each growth column having
            a front column side facing in the second forward direction, and
            a plurality of growth pod ports in the front column side and vertically distributed along the growth column, and
        a grow light assembly positioned outwardly of the growth columns in the second forward direction, the grow light assembly having
            at least one light source, and
            a light vector that directs at least 75% of light emitted from the at least one light source outwardly away from the growth columns in the second forward direction toward the front module side of the third growth module.

Item 15. The hydroponic plant growth module of any other item, wherein the front module side of the third growth module is oriented to face in the first forward direction toward the second front module side of the first growth module.

Item 16. The hydroponic plant growth module of any other item, wherein the third growth module has
    a module frame having an upper frame end vertically spaced apart from a lower frame end,
    a plant growth subassembly positioned at the front module side, the plant growth subassembly including
        a plurality of vertically extending growth columns secured to the module frame, the plurality of growth columns being distributed across the module frame in the lateral direction, each growth column having
            a front column side facing in the first forward direction, and
            a plurality of growth pod ports in the front column side and vertically distributed along the growth column, and
        a grow light assembly positioned outwardly of the growth columns in the first forward direction, the grow light assembly having
            at least one light source, and
            a light vector that directs at least 75% of light emitted from the at least one light source outwardly away from the growth columns in the first forward direction toward the second front module side of the first growth module.

Item 17. A method of growing plants using a hydroponic plant growth system, the method comprising:
    emitting light from a first grow light source of a first growth module outwardly away from a front module side of the first growth module in a first forward direction to illuminate a front module side of a second growth module, the front module side of the second growth module spaced apart from and facing the front module side of the first growth module, emitting light from a second grow light source of the second growth module outwardly away from the front module side of the second growth module in a second forward direction to illuminate the front module side of the first growth module, the second forward direction being opposite to the first forward direction, irrigating a first plurality of plants having roots at a plurality of growth pod ports in the front module side of the first growth module, and irrigating a second plurality of plants having roots at a plurality of growth pod ports in the front module side of the second growth module.

Item 18. The method of any other item, wherein emitting light from the first grow light source comprises directing a light vector of the first grow light source at an angle of between 45-degrees and 90-degrees to the front module side of the first growth module in the first forward direction, and emitting light from the second grow light source comprises directing a light vector of the second grow light source at an angle of between 45-degrees and 90-degrees to the front module side of the second growth module in the second forward direction.

Item 19. The method of any other item, wherein emitting light from the first grow light source comprises directing at least 75% of light emitted from the first grow light source toward the front module side of the second growth module, and emitting light from the second grow light source comprises directing at least 75% of light emitted from the second grow light source toward the front module side of the first growth module.

Item 20. The method of any other item, further comprising positioning a first plurality of growth pods in the plurality of growth pod ports in the front module side of the first growth module, each growth pod of the first plurality of growth pods containing a plant of the first plurality of plants, and positioning a second plurality of growth pods in the plurality of growth pod ports in the front module side of the second growth module, each growth pod of the second plurality of growth pods containing a plant of the second plurality of plants.

Item 21. The method of any other item, wherein each growth pod of the first and second plurality of growth pods further contains a growing medium.

The invention claimed is:

1. A hydroponic plant growth module, comprising:
a front module side facing in a forward direction,
a module frame having an upper frame end vertically spaced apart from a lower frame end, and
a plant growth subassembly positioned at the front module side of the growth module, the plant growth subassembly including:
  a plurality of vertically extending growth columns secured to the module frame, the plurality of growth columns being distributed across the module frame in a lateral direction, each growth column having:
    a front column side facing in the forward direction, and
    a plurality of growth pod ports in the front column side and vertically distributed along the growth column, and
  a grow light assembly positioned outwardly of the growth columns in the forward direction, the grow light assembly having:
    at least one light source, and
    a light vector that directs at least 75% of light emitted from the at least one light source outwardly away from the growth columns in the forward direction.

2. The hydroponic plant growth module of claim 1, wherein the light vector is at an angle of between 45-degrees and 90-degrees to the growth columns in the forward direction.

3. The hydroponic plant growth module of claim 1, wherein the light vector directs at least 95% of light emitted from the at least one light source outwardly away from the growth columns in the forward direction.

4. The hydroponic plant growth module of claim 1, wherein the at least one light source of the grow light assembly comprises at least two vertically spaced apart light sources.

5. The hydroponic plant growth module of claim 1, wherein the grow light assembly is a lower grow light assembly positioned outwardly of the growth columns in the forward direction proximate the lower frame end and the growth module further comprises an upper grow light assembly positioned outwardly of the growth columns in the forward direction proximate the upper frame end.

6. The hydroponic plant growth module of claim 5, wherein the light vector of the lower grow light assembly is at an upward angle of between 45-degrees and 90-degrees to the growth columns in the forward direction and a light vector of the upper grow light assembly is at a downward angle of between 45-degrees and 90-degrees to the growth columns in the forward direction.

7. The hydroponic plant growth module of claim 5, wherein the lower grow light assembly comprises two vertically spaced apart light sources and the upper grow light assembly comprises three vertically spaced apart light sources, each light source extending in the lateral direction.

8. The hydroponic plant growth module of claim 1, wherein the plurality of growth columns collectively have a column width in the lateral direction, the grow light assembly has an assembly width in the lateral direction, and the assembly width is at least 75% of the column width.

9. The hydroponic plant growth module of claim 1, wherein the front module side is a first front module side, the forward direction is a first forward direction, the plant growth subassembly is a first plant growth subassembly, and the growth module further comprises:
a second front module side facing in a second forward direction opposite to the first forward direction, the second front module side having a second plant growth subassembly including:
  a plurality of vertically extending growth columns secured to the module frame, the plurality of growth columns being distributed across the module frame in the lateral direction, each growth column having:
    a front column side facing in the second forward direction, and
    a plurality of growth pod ports in the front column side and vertically distributed along the growth column, and
  a grow light assembly positioned outwardly of the growth columns in the second forward direction, the grow light assembly having:
    at least one light source, and
    a light vector that directs at least 75% of light emitted from the at least one light source outwardly away from the growth columns in the second forward direction.

10. A hydroponic plant growth system, comprising:
a first growth module spaced apart from and opposed to a second growth module, the first growth module having:
  a front module side oriented to face in a first forward direction toward a front module side of the second growth module,
  a module frame having an upper frame end vertically spaced apart from a lower frame end, and
  a plant growth subassembly positioned at the front module side, the plant growth subassembly including:
    a plurality of vertically extending growth columns secured to the module frame, the plurality of growth columns being distributed across the module frame in a lateral direction, each growth column having:
      a front column side facing in the first forward direction, and
      a plurality of growth pod ports in the front column side and vertically distributed along the growth column, and
    a grow light assembly positioned outwardly of the growth columns in the first forward direction, the grow light assembly having:
      at least one light source, and
      a light vector that directs at least 75% of light emitted from the at least one light source outwardly away from the growth columns in the first forward direction toward the front module side of the second growth module.

11. The hydroponic plant growth system of claim 10, wherein the front module side of the second growth module is oriented to face in a second forward direction toward the front module side of the first growth module, the second forward direction being opposite to the first forward direction.

12. The hydroponic plant growth system of claim 11, wherein the second growth module has:
  a module frame having an upper frame end vertically spaced apart from a lower frame end,
  a plant growth subassembly positioned at the front module side, the plant growth subassembly including:
    a plurality of vertically extending growth columns secured to the module frame, the plurality of growth columns being distributed across the module frame in the lateral direction, each growth column having:
      a front column side facing in the second forward direction, and
      a plurality of growth pod ports in the front column side and vertically distributed along the growth column, and
    a grow light assembly positioned outwardly of the growth columns in the second forward direction, the grow light assembly having:
      at least one light source, and
      a light vector that directs at least 75% of light emitted from the at least one light source outwardly away from the growth columns in the second forward direction toward the front module side of the first growth module.

13. The hydroponic plant growth system of claim 11, further comprising a third growth module spaced apart from and opposed to the first growth module, wherein the front module side of the first growth module is a first front module side, the plant growth subassembly of the first growth module is a first plant growth subassembly, and the first growth module further has:
  a second front module side oriented to face in the second forward direction toward a front module side of the third growth module, and
  a second plant growth subassembly positioned at the second front module side, the second plant growth subassembly including:
    a plurality of vertically extending growth columns secured to the module frame, the plurality of growth columns being distributed across the module frame in the lateral direction, each growth column having:
      a front column side facing in the second forward direction, and
      a plurality of growth pod ports in the front column side and vertically distributed along the growth column, and
    a grow light assembly positioned outwardly of the growth columns in the second forward direction, the grow light assembly having:
      at least one light source, and
      a light vector that directs at least 75% of light emitted from the at least one light source outwardly away from the growth columns in the second forward direction toward the front module side of the third growth module.

14. The hydroponic plant growth system of claim 13, wherein the front module side of the third growth module is oriented to face in the first forward direction toward the second front module side of the first growth module.

15. The hydroponic plant growth system of claim 14, wherein the third growth module has;
  a module frame having an upper frame end vertically spaced apart from a lower frame end,
  a plant growth subassembly positioned at the front module side, the plant growth subassembly including:
    a plurality of vertically extending growth columns secured to the module frame, the plurality of growth columns being distributed across the module frame in the lateral direction, each growth column having:
      a front column side facing in the first forward direction, and
      a plurality of growth pod ports in the front column side and vertically distributed along the growth column, and
    a grow light assembly positioned outwardly of the growth columns in the first forward direction, the grow light assembly having:
      at least one light source, and
      a light vector that directs at least 75% of light emitted from the at least one light source outwardly away from the growth columns in the first forward direction toward the second front module side of the first growth module.

* * * * *